(12) United States Patent
Brooks et al.

(10) Patent No.: US 6,169,783 B1
(45) Date of Patent: **\*Jan. 2, 2001**

(54) LINE TESTING IN A TELECOMMUNICATIONS NETWORK

(75) Inventors: Alvin Brooks, Lancs; Frank Graham Ward, Cheshire; Stephen F Lee, Bolton, all of (GB)

(73) Assignee: British Telecommunicaitons public limited company, London (GB)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/029,974

(22) PCT Filed: Sep. 12, 1996

(86) PCT No.: PCT/GB96/02267

§ 371 Date: Mar. 10, 1998

§ 102(e) Date: Mar. 10, 1998

(87) PCT Pub. No.: WO97/10666

PCT Pub. Date: Mar. 20, 1997

(30) Foreign Application Priority Data

Sep. 12, 1996 (EP) .................................................. 95306376

(51) Int. Cl.[7] .............................. H04M 1/24; H04M 3/08; H04M 3/22
(52) U.S. Cl. .................................. 379/9; 379/21; 379/29; 379/142
(58) Field of Search .................................... 379/6, 22–24, 379/26–29, 30–31, 93.23, 142, 354, 88.19, 88.2–88.21, 133–134, 120, 127, 21

(56) References Cited

U.S. PATENT DOCUMENTS

| | | |
|---|---|---|
| 4,670,898 | 6/1987 | Pierce et al. . |
| 4,764,949 | 8/1988 | Faith et al. . |
| 5,073,919 | * 12/1991 | Hagensick ................................ 379/29 |
| 5,799,060 | * 8/1998 | Kennedy et al. ....................... 379/29 |
| 5,857,011 | * 1/1999 | Kennedy et al. ....................... 379/32 |

FOREIGN PATENT DOCUMENTS

| | | |
|---|---|---|
| 3512787 | 4/1985 | (DE) . |
| 3521787 A1 | 1/1986 | (DE) . |
| 0589248 A2 | 8/1993 | (EP) . |
| 0700193 A2 | 3/1996 | (EP) . |
| WO 87/06421 | 10/1987 | (WO) . |
| WO 89/03622 | 4/1989 | (WO) . |
| WO 95/07588 | 3/1995 | (WO) . |
| WO 9507588 | 3/1995 | (WO) . |
| WO 97/10666 | 3/1997 | (WO) . |

* cited by examiner

Primary Examiner—Duc Nguyen
(74) Attorney, Agent, or Firm—Nixon & Vanderhye P.C.

(57) ABSTRACT

A centralized test apparatus is provided for a telecommunications network which includes local switches and a core network. Each local switch is connected through terminating lines to terminating equipment such as telephone handsets. The test apparatus enables a field engineer to obtain the identity of a terminating line from one of the local switches. When a field engineer dials the number of the test apparatus, the test apparatus retrieves the calling line identity on answering the call. It then transmits the calling line identity in speech form back to the calling line. After transmitting the calling line identity, the test apparatus offers a menu of further services which comprise a ring back service and the provision of a test tone on a specified telephone line.

20 Claims, 6 Drawing Sheets

LINE TESTING IN A TELECOMMUNICATIONS NETWORK

BACKGROUND OF THE INVENTION

1. Field of the Invention

This invention relates to a method of, and an apparatus for, line testing in a telecommunications network.

2. Related Art

A conventional public telecommunications network comprises a relatively small number of interconnected main switches and a much larger number of local switches, each of which is connected to one or two main switches. The local switches are connected to the terminating lines of the network and the far ends of these lines are connected to terminal equipment, such as telephone instruments located in customers' premises. The network formed from the main switches and local switches is known as the core network while the network formed from the terminating lines is known variously as the access network or local loop. In this specification, it will be referred to as the access network. In the access network, each terminating line is formed from a pair of copper wires and, typically, between the local switch and terminal equipment, each terminating line passes through several junctions.

A field engineer working in an access network will sometimes need to check the identity or telephone number of a pair of copper wires. In a typical public telecommunications network, some, but not all, of the local switches have test equipment which is capable of transmitting the calling line identity in speech form to an engineer working on a particular terminating line. An example of a local switch having this facility is described in WO87/06421. This causes two problems. Firstly, when an engineer wishes to check the identity of a pair of copper cables, he may not know whether the pair of cables is connected to a local switch which has such test equipment. Secondly, when an engineer wishes to check the identity of a pair of copper cables which are connected to a local switch which does not have such test equipment, it may be difficult or even impossible for the engineer to discover the identity of the pair of copper wires.

SUMMARY OF THE INVENTION

According to a first aspect of this invention there is provided a method of line testing in a telecommunications network which comprises a network of switches, said network having a test apparatus connected to one of said switches, said test apparatus having a predefined telephone number, said method comprising the steps of:

dialling the predefined telephone number of said test apparatus from a telephone instrument connected to a telephone line;

routing the call from the user through the network to the test apparatus;

said test apparatus answering the call and retrieving the calling line identity of the line from which the call is made, and said test apparatus transmitting the calling line identity in speech form to the line from which the call was made.

The present invention provides an easy method for a field engineer to check the identity of a pair of lines in the access network.

According to a second aspect of this invention there is provided, in a telecommunications network comprising a network of switches arranged to make connections between terminating telephone lines connected to at least some of said switches, a test apparatus having a predefined telephone number connected to one of said switches and arranged to receive a call routed to it through said network from one of said terminating lines, said test apparatus comprising:

means for answering a call, said call answering means being arranged to retrieve the calling line identity of the line from which the call is made; and means for transmitting the calling line identity in speech form to the line from which the call was made.

According to a third aspect of this invention there is provided, in a telecommunications network comprising a network of switches arranged to make connections between terminating telephone lines connected to at least some of said switches, a test apparatus having a predefined telephone number connected to one of said switches and arranged to receive a call routed to it through said network from one of said terminating lines, said test apparatus comprising a computer controlled by a program so as to perform the following operations on receiving a call:

answer the call;

retrieve the calling line identity of the line from which the call was made; and transmit the calling line identity in speech form to the line from which the call was made.

Some local switches have test equipment which is capable of applying a test tone to a specified pair of copper wires and which can then be used for cable pair identification. Where a local switch has such equipment, an engineer may access it from a terminating line belonging to the switch by dialling the short code for the test equipment. Alternatively, he may access it from any other telephone line by dialling its full code telephone number. However, if the engineer is unable to dial in on one of the terminating lines of the switch and he does not know the full code number of the test equipment, he is faced with the problem of not being able to use the test equipment.

According to a fourth aspect of this invention, there is provided a method of applying a test tone to a terminating line of a telecommunications network which comprises a network of switches, said network including local switches connected to terminating lines, at least some of said local switches being provided with test equipment which is capable of providing a test tone on a specified terminating line, said network having a test apparatus connected to one of said switches, said test apparatus having a predefined telephone number, said method comprising the steps of:

said test apparatus receiving a call routed through said network from a user in which the user specifies a terminating line on which a test tone is required; and said test apparatus instructing the test equipment of the local switch to which the specified terminating line is connected to provide a test tone on the specified terminating line.

According to a fifth aspect of this invention there is provided, in a telecommunications network comprising a network of switches, said network including local switches connected to terminating lines, at least some of said local switches being provided with test equipment which is capable of providing a test tone on a specified terminating line, a test apparatus having a predefined telephone number connected to one of said local switches and arranged to receive a call routed to it through said network from one of said terminating lines; said test apparatus comprising:

means for receiving a call from a user in which the user specifies a terminating line on which a test tone is required; and means for instructing the test equipment of a local switch to which the specified terminating line is connected to provide a test tone on the specified terminating line.

BRIEF DESCRIPTION OF THE DRAWINGS

This invention will now be described in more detail, by way of example, with reference to the drawings in which.

DETAILED DESCRIPTION OF EXEMPLARY EMBODIMENTS

Figure 1:
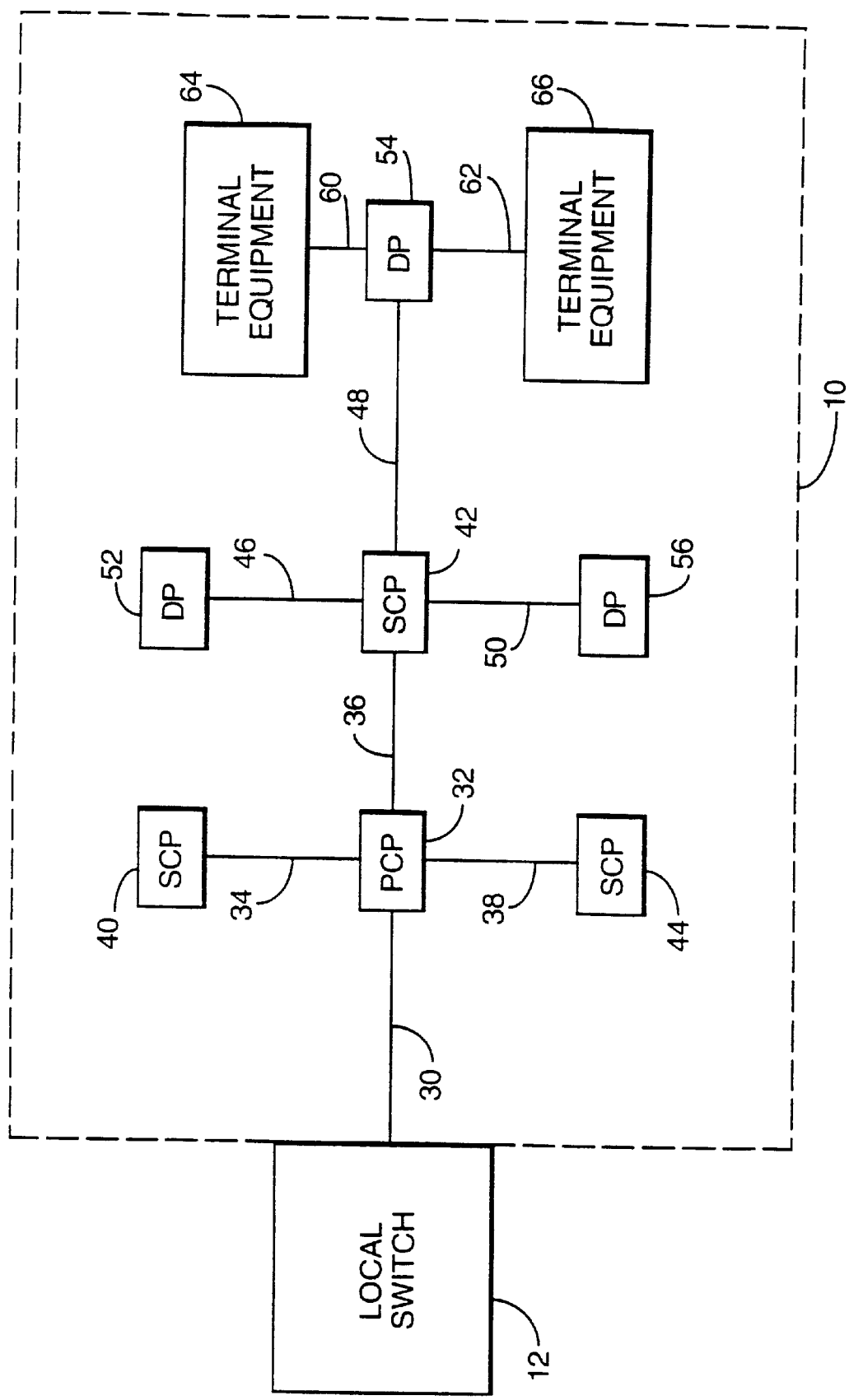
FIG. 1 is a block diagram of an access network and associated local switch which form part of a telecommunications network in which the present invention may be used.
Figure 4:
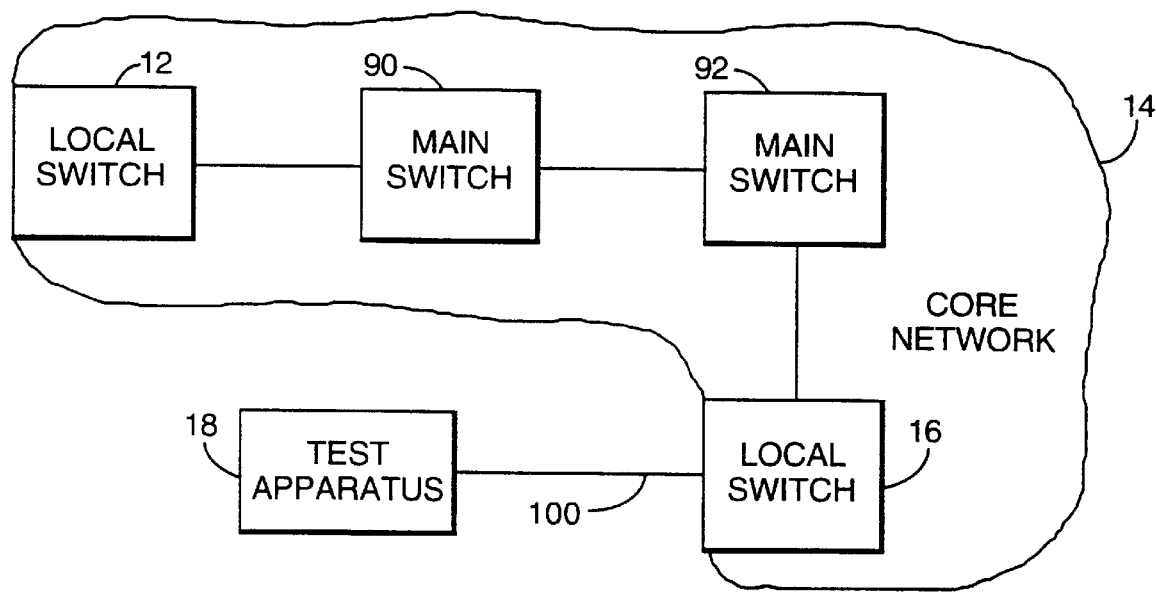
FIG. 4 is a block diagram showing the local switch of FIG. 1, part of the core network of the telecommunications network and a test apparatus embodying this invention.

Referring to FIG. 1, there is shown an access network 10 forming part of a public telecommunications network. The access network 10 is connected to a local switch 12. As shown in FIG. 4, the local switch 12 forms part of the core network 14 of the public telecommunications network. The core network 14 includes other local switches including a local switch 16. The local switch 16 is connected to a centralised test apparatus 18.

The test apparatus 18 permits a field engineer to test lines in the access network 10. Specifically, when a field engineer wishes to check the identity of a pair of wires forming a line in the access network, he dials the test apparatus 18 which then returns the identity of the line to him in speech form. The test apparatus 18 can also be used to perform a ringback test, a test in which a quiet line termination is applied to a line, and to arrange for a test tone to be applied to a line specified by a field engineer to assist in cable pair identification in the access network.

Before describing the test apparatus 18 in detail, the access network 10, the local switch 12 and the core network 14 will be described in further detail.

Referring now to FIG. 1, the local switch 12 is connected to the terminating lines of the public telecommunications network for the area which it serves. Typically a local switch is connected to several thousand terminating lines. Each terminating line passes through several junctions before reaching its respective terminal equipment.

Each terminating line is formed from a pair of copper wires. The copper wires leave the local switch 12 in the form of one or more cables. One of these cables is shown in FIG. 1 and indicated by reference numeral 30. The far end of cable 30 from switch 12 is connected to a primary cross-connect point (PCP) 32 which may be housed in a street cabinet or underground junction box. From the primary cross-connect point 32, the terminating lines branch out as cables in several directions. For reasons of simplicity, in FIG. 1 there are shown only three cables 34, 36 and 38 leaving the primary cross-connect point 32. The far ends of cables 34, 36 and 38 from the primary cross-connect point 32 are connected, respectively, to secondary cross-connect points (SCPs) 40, 42 and 44. For reasons of simplicity, the continuation of the terminating lines beyond secondary cross-connect points 40 and 44 is not shown.

The secondary cross-connect point 42 is housed in a junction box which may be located above or below the ground. From the secondary cross-connect point 42, the terminating lines branch out again in several directions in the form of cables. By way of illustration, FIG. 1 shows cables 46, 48 and 50 leaving secondary cross-connect point 42. The far ends of cables 46, 48 and 50 from secondary cross-connect point 42 are connected, respectively, to distribution points (DPs) 52, 54 and 56. For reasons of simplicity, the terminating lines beyond distribution points 52 and 56 are not shown.

Distribution points are implemented as junctions boxes which are typically located on telephone poles. From each distribution point, the terminating lines branch out as single copper cable pairs to the premises where terminal equipment are located. By way of illustration, FIG. 1 shows two single copper cable pairs 60, 62 leaving the distribution point 54. The far ends of cables 60 and 62 are connected, respectively, to terminal equipment 64 and 66. As is well known, terminal equipment may take various forms. For example, terminal equipment may be a public telephone located in a public telephone box, a telephone instrument located in a domestic house or an office, or a fax machine or a computer located in customers' premises.

Figure 2:
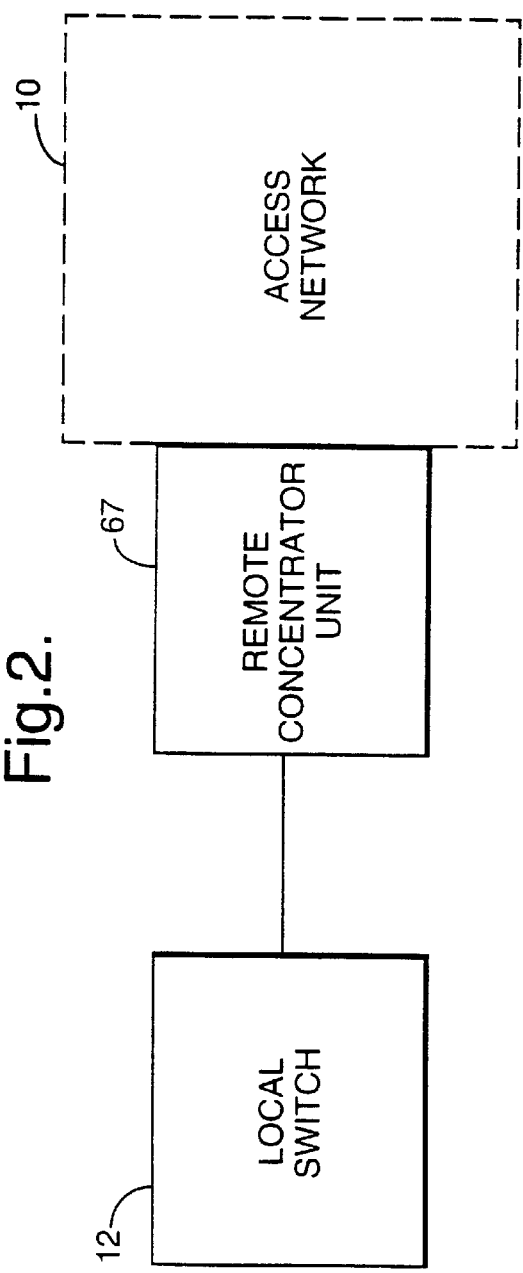
FIG. 2 is a block diagram showing a remote concentrator unit between a local switch and an access network.

Referring now to FIG. 2, there is shown an alternative arrangement in which there is a remote concentrator unit 67 between the local switch 12 and the access network 10.

Where a local switch is connected directly to the terminating line, the access network commences on the terminating lines side of the main distribution frame of the local switch. Where there is a remote concentrator unit, the access network commences on the terminating lines side of the main distribution frame of the remote concentrator unit.

The primary cross-connect points, the secondary cross-connect points and the distribution points all represent junctions where a field engineer may want to perform line testing. A field engineer may also wish to perform line testing at the termination of a line or on the terminating lines side of a main distributor frame. For some terminating lines, secondary cross-connect points are not used while other terminating lines may pass through additional junctions. At a junction or at the termination of a line or on a main distribution frame, a field engineer may wish to check on the identity of a line. For example, the record relating to a junction may contain errors relating to the identity of lines with the result that an engineer cannot rely always on the record of a junction to determine the identity of a particular line. There are also occasions when an engineer wishes to trace a line over all or part of its path from the local switch to its termination.

Figure 3:
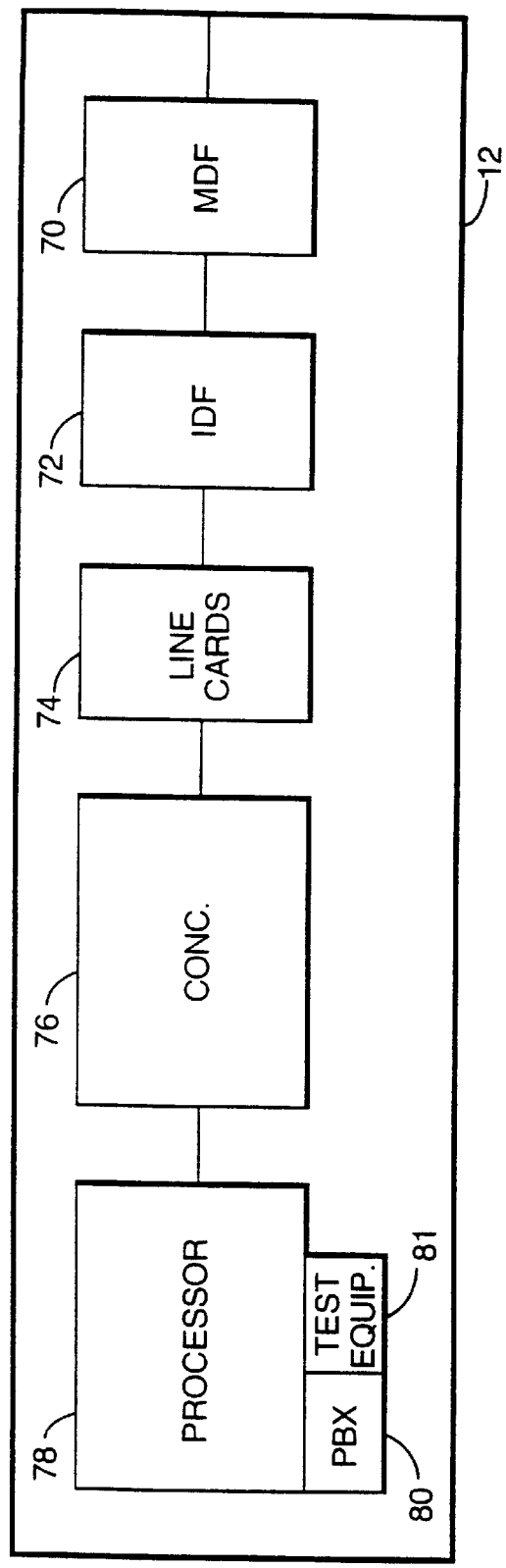
FIG. 3 is a block diagram showing the components of the local switch of FIG. 1.

In the present example, the local switch 12 is a System X switch manufactured by GEC Plessey Telecommunications Limited. The main components of the switch 12 are shown in FIG. 3. In the switch 12, the cables from the access network as well as cables from the core network are connected to a main distribution frame (MDF) 70. From the main distribution frame 70, the lines are cross-connected to an intermediate distribution frame (IDF) 72. From the intermediate distribution frame 72, each line is connected to a respective one of a bank of line cards 74. From the line cards 74, lines are connected to a concentrator 76 and the output lines from the concentrator 76 are connected to a processor 78. The processor 78 performs the main switching function of the switch 12.

The switch 12 includes a private branch exchange 80. The private branch exchange 80 is connected to test equipment 81 which has its own telephone number. The test equipment 81 provides various facilities including test facilities. One of these test facilities is the provision of a test tone for use in cable pair identification. In order to obtain the test tone, a field engineer dials the telephone number of the test equipment 81, then the code number for requesting the provision of a test tone, and then the telephone number of the line on which the test tone is required. The test equipment 81 then connects a test tone at 800 Hz to the telephone line specified by the field engineer. The tone is removed when a call is made. If the engineer dials in on one of the terminating lines of the switch, he can access the test equipment 81 by dialling its short code.

The local switch 12 is only one of many local switches of the public telecommunications network. In a large network, there may be many hundreds of local switches. Each local switch is connected to two main switches. The reason for connecting the local switch to two main switches, rather than one, is to provide security.

Referring now to FIG. 4, there is shown the core network 14. For reasons of simplicity, only two main switches, designated by reference numerals 90 and 92 are shown in the core network 14. However, in a large public telecommunications network there are a large number of fully interconnected main switches. For example, in BT's UK public telecommunications network, there are more than sixty main switches. FIG. 4 shows the connection of the local switch 12 to the main switch 90 and, for reasons of simplicity, the connection of the local switch 12 to a second main switch is omitted.

FIG. 4 shows a further local switch 16. The local switch 16 is connected to the main switch 92. The connection of the local switch 16 to a second main switch in the core network 14 is omitted for reasons of simplicity.

The test apparatus 18 is connected by a telecommunications link 100 to the local switch 16. In the present example, the telecommunications link 100 is a thirty channel ISDN link. The test apparatus can serve up to 15 users simultaneously. The test apparatus 18 has its own telephone number and may be accessed simply by dialling its telephone number from any point in the telecommunications network. The test apparatus 18 may also be accessed by dialling a short code which is then translated into the full telephone code for the test apparatus 18 in the local switch connected to the line from which the call is made. Thus, the test apparatus 18 forms a centralised test apparatus for the whole network.

Figure 5:
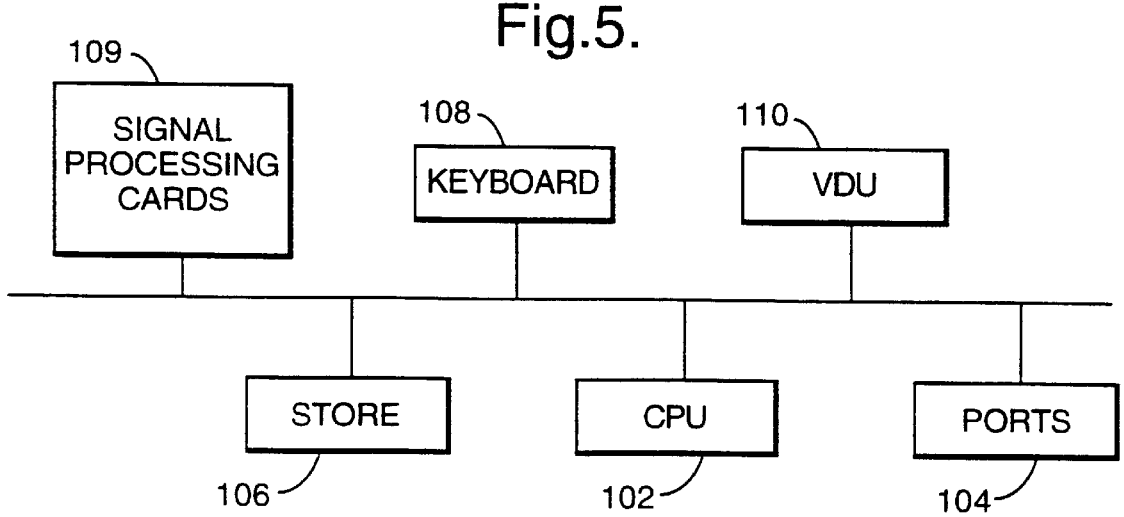
FIG. 5 is a block diagram of the components of the test apparatus of FIG. 4.
Figure 6A:
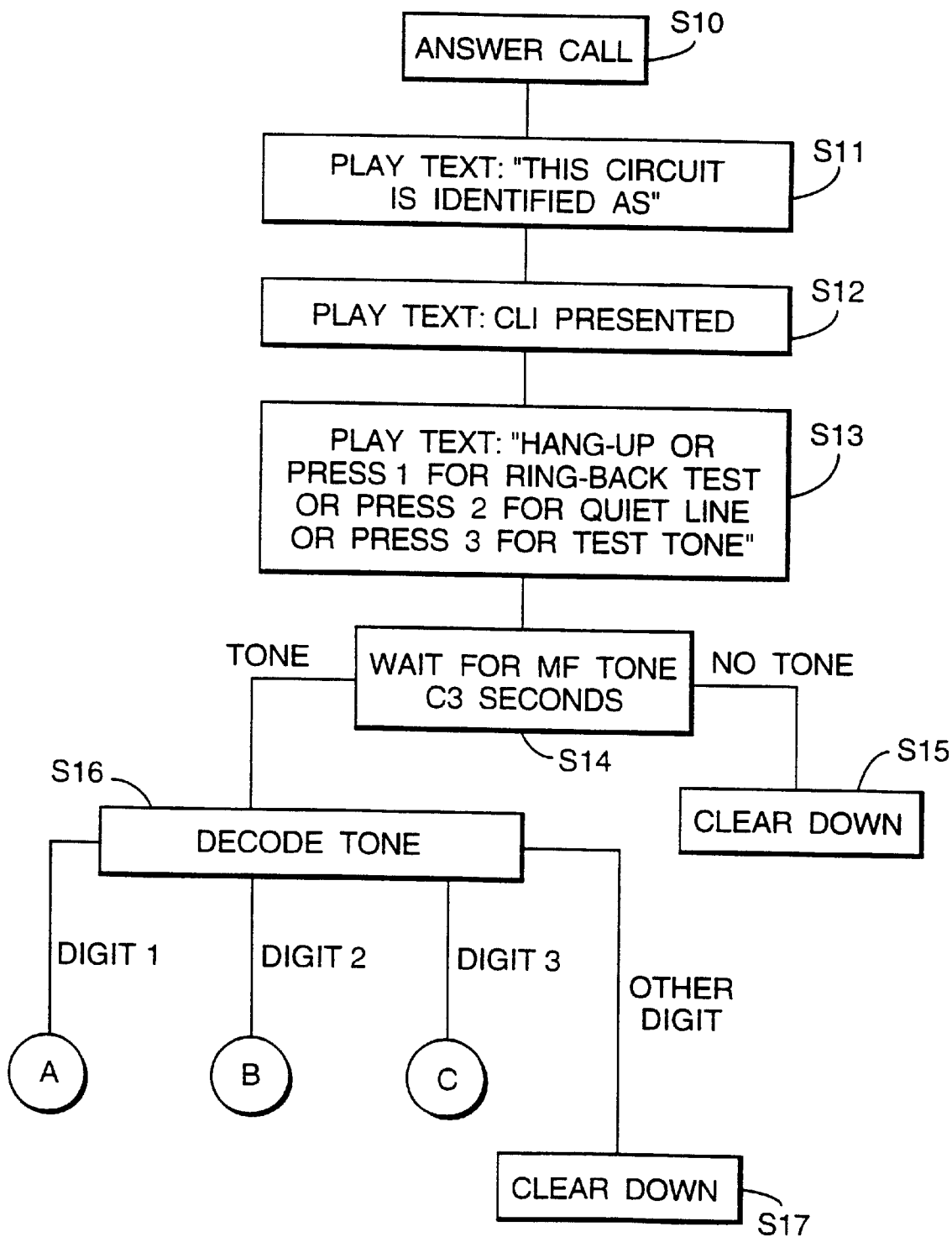
FIG. 6 is a flow chart of the main program used in the test apparatus shown in FIG. 3.
Figure 6B:
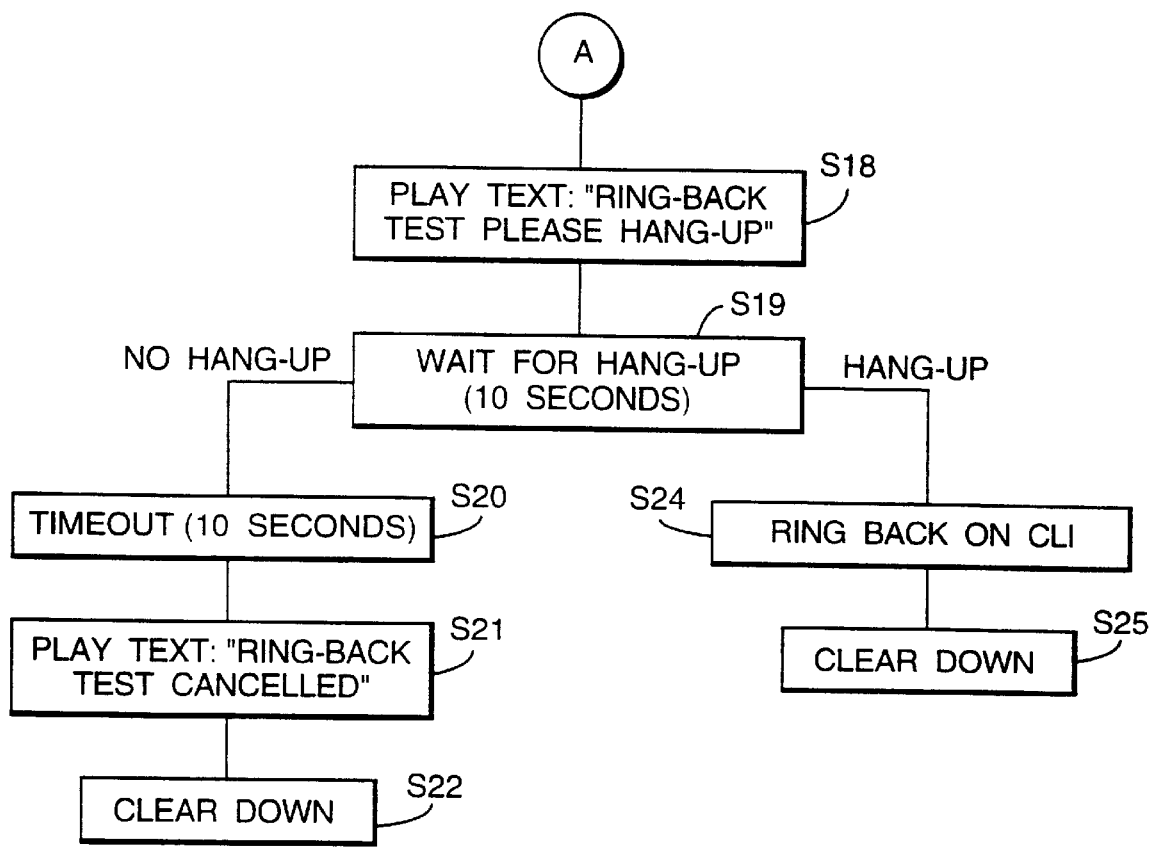
Figure 6D:
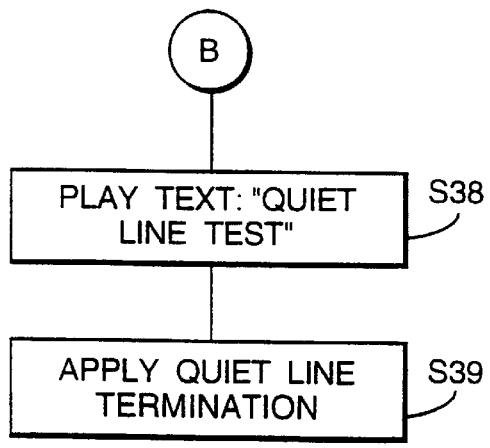
Figure 6C:
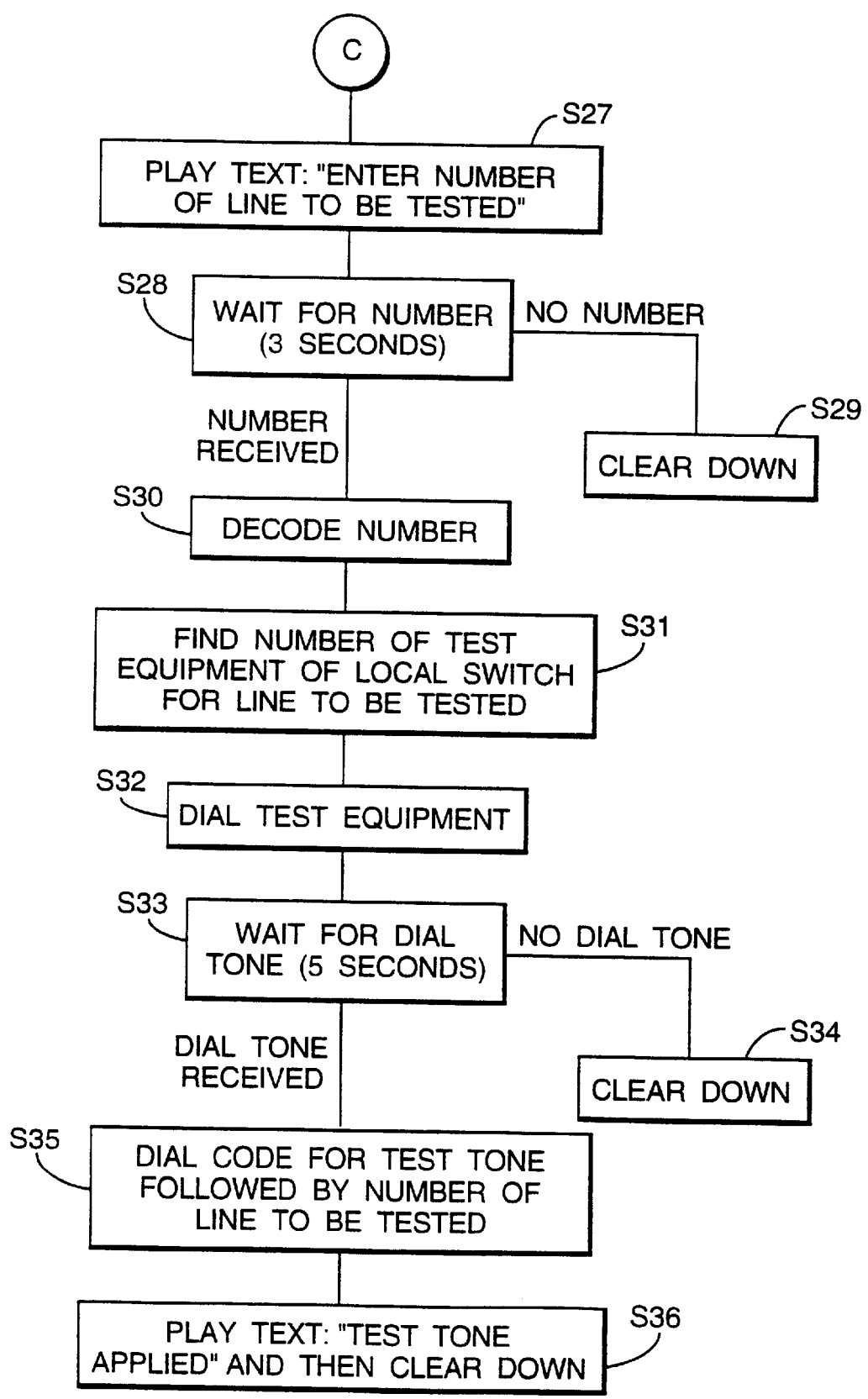

In the present example, the test apparatus 18 is implemented as a computer, the components of which are shown in FIG. 5. Referring now to FIG. 5, the components of the computer which forms test apparatus 18 comprise a central processing unit (CPU) 102, a set of ports 104 for connecting the computer to the telecommunications link 100, a store 106, a keyboard 108, signal processing cards 109 and a visual display unit (VDU) 110. The signal processing cards 109 include a speech synthesiser card, a multi-frequency detector card and a multi-frequency generator card.

The store 106 is formed from hard disk memory, read only memory (ROM) and random access memory (RAM). The store 106 contains the program for controlling the computer.

In the telecommunications network described in this example, the calling line identity of the calling line is transmitted at the beginning of each call to the called line. The calling line identity is also transmitted in the signalling channel of a 30 channel ISDN link. Thus, at the beginning of a call, terminal equipment attached to the end of a single line or the end of a 30 channel ISDN link can retrieve the calling line identity.

Referring now to FIG. 6, there is shown a flow chart of the main program used in test apparatus 18. The test apparatus 18 runs the main program for each call which is made to it.

After entering the main program, in a step S10, the test apparatus answers the call. At the beginning of step S10 it also retrieves the calling line identity of the line from which the call was made from the signalling channel of the ISDN link. Immediately after step S10, in a step S11, it plays the following text to the line from which the call was made: "this circuit is identified as". Immediately after performing step S11, in a step S12, it plays the number of the line from which the call was made.

By way of modification, the test apparatus 18 may be placed at the end of an ordinary single telephone line. With this modification, it retrieves the calling line identity which is transmitted at the beginning of the call.

Thus, as a result of performing steps S10 to S12, the number of the line from which the call was made is transmitted back to the calling line and so to the calling party in speech form. Thus, by dialling the test apparatus 18, a field engineer may identify a line at a junction point or terminal point in the access network.

Speech form is a particularly convenient way of presenting the calling line identity as it permits a field engineer to obtain the calling line identity merely by using an ordinary telephone instrument and without the need of special equipment.

After performing step S12, in a step S13, the test apparatus plays the following text: "hang-up or press 1 for ring back test or press 2 for quiet line or press 3 for test tone". Thus, in step S13, the test apparatus is offering a menu which comprises three further services. The first of these services is a ring back test which may be obtained simply by pressing numeral 1 on a telephone instrument. The second test is the provision of a quiet line which may be used to test for the presence of noise and which may be obtained simply by pressing numeral 2 on a telephone instrument. The third test is the provision of a test tone which may be obtained simply by pressing numeral 2 on a telephone instrument.

After step S13, in a step S14, the test apparatus 18 awaits the return of a multi-frequency (MF) tone from the calling line. (As is well known, in a modern telecommunications network, when a number key is pressed on a telephone handset, the number is transmitted as a multi-frequency tone). If no tone is received within three seconds, the test apparatus 18 clears down the call.

If a multi-frequency tone is received, then in a step S16, the test apparatus 18 decodes the tone. If the tone is decoded as a digit other than 1 or 2 or 3, the test apparatus 18 clears down the call in a step S17.

If the tone is decoded as digit 1, then in a step S18, the test apparatus plays the following text: "ring back test please hang up". Thus, in step S18, the test apparatus invites the user on the calling line to hang up to obtain a ring back test.

In a step S19, the test apparatus waits for the user to hang up. If the user does not hang up within ten seconds, the test apparatus proceeds to step S20 where it waits for a further ten seconds. At the end of this ten second period, it proceeds to step S21 in which it plays the following text: "ring back test cancelled". Thus, in step S21, the user is advised that the ring back test is cancelled. In a step S22, the test apparatus then clears down the call.

If in step S19 the user hangs up within the ten second period, the test apparatus proceeds to step S24 in which it dials the number of the calling line so as to perform a ring back test. It then clears down the call in a step S25.

Thus, steps S18, S19 and S24 provide a ring back test on the calling line. A field engineer will request a ring back test when he wishes to test the ability of the calling line to receive calls or to test a telephone bell. The ring back test will also increase the engineer's confidence that the calling line has been identified correctly.

If in step S16 the tone is decoded as digit 3, the program proceeds to step S27. In step S27, the test apparatus plays the following text: "enter number of line to be tested". Thus, step S27 is an invitation to the user to specify the line on which a test tone is required. It should be noted that the user is free to request a test tone on any terminating line of the network and not just the line on which he is calling. For example, where a user wishes to request a test tone on a particular terminating line connected to a particular local switch, he may dial in on a terminating line connected to another local switch or from a mobile phone. Thus, an engineer working on a junction box located on a pole may use his mobile phone to obtain a test tone on a specified line.

After step S27, in a step S28, the test apparatus waits for three seconds to receive the number of the line to be tested. If no number is received within the three second period, in a step S29 the test apparatus clears down the call.

If a number is received within the three second period, the program continues with a step S30. The number will be transmitted as a series of multi-frequency tones and these tones are decoded in step S30.

The store 106 of test apparatus 18 contain a database which relates the numbers of the terminating lines of the network to the numbers of the test equipment of the local switches of the network. Thus, for each telephone number of a terminating line, the database has the number of the test equipment of the local switch to which that terminating line is connected. For example, for a terminating line having the telephone number: "0171 728 7915", the telephone number of the test equipment of the switch to which that terminating line is connected could be: "0171 728 0001".

After performing step S30, in a step S31, the program accesses the database and obtains the number of the test equipment of the local switch for the line to be tested.

Then, in a step S32, it dials that test equipment.

Each test equipment is arranged to return a dial tone when it answers a call. In a step S33, the test apparatus 18 awaits the dial tone from the test equipment. If the dial tone is not received within five seconds, in a step S34, it clears down the call.

If the dial tone is received, in a step S35, it dials the code for the test tone followed by the number of the line to be tested. The code for the test tone amounts to an instruction to the test equipment to provide the test tone facility for the number which follows. The test equipment then provides a test tone on the line to be tested. As mentioned above, the test tone will be applied continuously until a call is made or answered on the line being tested.

Lastly, in a step S36, the test apparatus plays the following text: "test tone applied". Thus, the user is advised that the test tone is now being applied. The test apparatus 18 then clears down the call.

The provision of a database which relates the numbers of the terminating lines to test equipment for the local switches to which the terminating lines are connected releases field engineers from the need to know the numbers of the test equipment.

By way of notification, the test apparatus may have a special telephone number for use where a test tone is required. With this modification, on answering a call, the program commences at step S27.

If in a step S16 the tone is decoded as digit 2, the program proceeds to step S38. In step S38, the test apparatus plays the following text: "Quiet line test". Then, in a step S39, it applies the correct termination to the line to achieve a quiet line. The test enables the user to check the line for the presence of noise.

What is claimed is:

1. A method of line testing in a telecommunications network which comprises a network of switches, said telecommunications network having a test apparatus connected to one of said switches, said test apparatus having a predefined telephone number, said method comprising the steps of:

dialling the predefined telephone number of said test apparatus from a telephone instrument connected to a telephone line;

routing the call from said telephone line through the network to the test apparatus;

said test apparatus answering the call and retrieving the calling line identity of the line from which the call is made, and said test apparatus transmitting the calling line identity in speech form to the line from which the call was made.

2. The method of line testing as claimed in claim 1, in which said step of transmitting the calling line identity to the line from which the call was made is made immediately after the step of retrieving the calling line identity.

3. The method of line testing as claimed in claim 1, in which, after transmitting the calling line identity to the line from which the call was made, said test apparatus performs the further steps of:

inviting the user of said telephone instrument to request a service; and in response to a request from the user to provide a service, providing the requested service.

4. The method of line testing as claimed in claim 3, in which in said step of inviting a user to request a service, the user is invited to request a service from a menu comprising at least one service.

5. The method of line testing as claimed in claim 4, in which said menu includes a ring back service.

6. The method of line testing as claimed in claim 5, in which, when requested to perform the ring back service, said test apparatus performs the steps of:

inviting the user to hang up; and in response to the user hanging up, dialling the telephone number of the line from which the call was made.

7. The method of line testing as claimed in claim 4, in which said menu includes a service in which a quiet line termination is applied to the line from which the call is made.

8. The method of line testing as claimed in any one of claims 4, in which said menu includes the provision of a test tone on a specified telephone line.

9. The method of line testing as claimed in claim 8, in which, when requested to perform the service of providing a test tone, the test apparatus performs the steps of:

inviting the user to specify the telephone number of the line on which the test tone is required; and in response to the user specifying the telephone number of the line on which the test tone is required, causing a test tone to be provided on the line so specified.

10. The method of line testing as claimed in claim 9, in which:

said network includes local switches connected to terminating lines;

in at least some of said local switches, there is provided test equipment which has a predefined telephone number and which is capable of providing a test tone on a specified telephone line;

said test apparatus has a database which relates telephone numbers of the terminating telephone lines to the telephone numbers of the test equipment of the local switches to which the terminating telephone lines are connected; and in said step of causing a test tone to be provided on the specified line, said test apparatus performs the steps of:

retrieving from its database the number of the test equipment of the local switch to which the terminating telephone line having the specified telephone number is connected;

dialling the telephone number so retrieved; and instructing the thus dialled test equipment to provide a test tone on the telephone line having the specified telephone number.

11. In a telecommunications network comprising a network of switches arranged to make connections between terminating telephone lines connected to at least some of said switches, a test apparatus having a predefined telephone number connected to one of the said switches and arranged to receive a call routed to it through said telecommunications network from one of said terminating lines, said test apparatus comprising:

means for answering a call, said call answering means being arranged to retrieve the calling line identity of the line from which the call is made; and means for transmitting the calling line identity in speech form to the line from which the call was made.

12. The test apparatus as claimed in claim 11, in which said means for transmitting the calling identity is arranged to transmit the calling line identity in speech form immediately after retrieving the calling line identity.

13. The test apparatus as claim in claim 11, or further including:

means for inviting a user of the network who makes a call to the test apparatus to request a service from a menu comprising at least one service; and means for providing a requested service.

14. The test apparatus as claimed in claim 13, in which said means for providing a requested service includes means for providing a ring back service.

15. The test apparatus as claimed in claim 14, in which said means for providing a ring back service includes:

means for inviting the user to hang up; and means for dialling the telephone number from which the call was made in response to the user hanging up.

16. The test apparatus as claimed in any one of claims 13, in which said means for providing a requested service includes means for providing a service in which a quiet line termination is applied to a line.

17. The test apparatus as claimed in any one of claims 13, in which said means for providing a requested service includes means for providing a test tone on a specified telephone line.

18. The test apparatus as claimed in claim 17, in which said means for providing a test tone on a specified line comprises:

means for inviting the user to specify the telephone number of the line on which the test tone is required; and means for causing a test tone to be provided on the line specified by the user.

19. The test apparatus as claimed in claim 18, in which:

said network includes local switches connected to terminating telephone lines;

in at least some of said local switches there is provided test equipment which has a predefined telephone number and which is capable of providing a test tone on a specified telephone line;

said test apparatus includes a database which relates the telephone numbers of terminating telephone lines to the telephone numbers of the test equipment of the local switches to which the terminating telephone lines are connected; and said means for causing a test tone to be provided on the line specified by the user comprises:

means for retrieving from said database the telephone number of the test equipment of the local switch to which the terminating telephone line having the specified number is connected;

means for dialling the telephone number so retrieved; and means for instructing the thus dialled test equipment to provide a test tone on the telephone line having the specified telephone number.

20. In a telecommunications network comprising a network of switches arranged to make connections between terminating telephone lines connected to at least some of said switches, a test apparatus having a predefined telephone number connected to one of said switches and arranged to receive a call routed to it through said network from one of said terminating lines, said test apparatus comprising a computer controlled by a program so as to perform the following operations on receiving a call:

answer the call;

retrieve the calling line identity of the line from which the call was made; and transmit the calling line identity in speech form to the line from which the call was made.

* * * * *